Dec. 24, 1940.    R. R. RICHOLT    2,225,845
CABLE LOCK
Filed Nov. 28, 1938

INVENTOR.
ROBERT R. RICHOLT.
BY
ATTORNEY.

Patented Dec. 24, 1940

2,225,845

UNITED STATES PATENT OFFICE 2,225,845

CABLE LOCK

Robert R. Richolt, Burbank, Calif., assignor to Lockheed Aircraft Corporation, a corporation of California Application November 28, 1938, Serial No. 242,783

9 Claims. (Cl. 74—222)

This invention relates to locks for flexible linear elements, and more particularly to the type of lock whereby a cable, rope, or like means, is releasably attached to a rotatable member, as a pulley or sheave, to prevent relative movement between the cable and the member, and which can be readily released to permit adjustment of the cable with respect to the movable member.

It is an object of this invention to provide a positive self-locking device that is not only adjustable but which is readily accessible and changeable within the limited space outlined and determined by the width of the pulley. This is advantageous in that several pulleys can be ganged together as a compact unit, thereby saving valuable space, weight, material and cost.

A further object is to provide a method and apparatus of simple and economical character by which positive locking of a cable to a movable member results, it being an especial feature of the invention that it avoids the altering of the cable in any way, and that the cable may be adjusted with respect to the movable member as desired. This feature is very advantageous in that the cable or pulley does not have to be prefabricated for the particular installation in which it is to be used. Another object of the invention is to provide one particular size of lock which may be employed for various sizes of cable stock.

Further objects and advantages will become apparent during the course of the following description taken in connection with the drawing in which.

Figure 1:
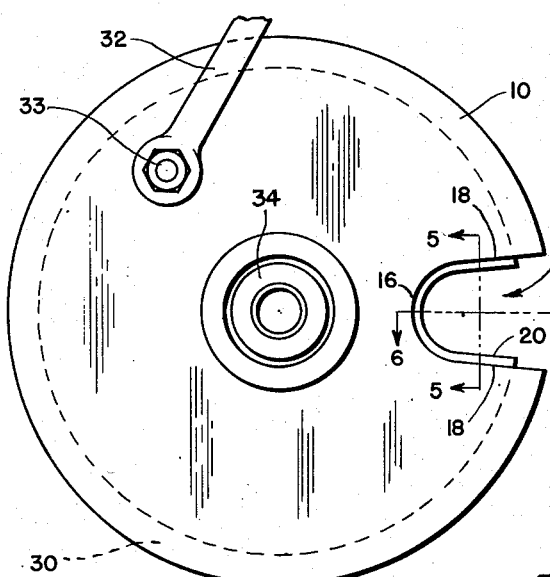
Fig. 1 is a side elevation of a pulley adapted to receive the cable lock of this invention.
Figure 3:
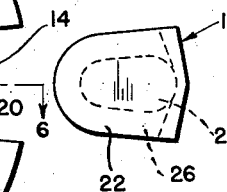
Fig. 3 is a side elevation of the cable lock device.

In the preferred embodiment the cable lock incorporating my invention is shown attached to an ordinary sheave, or pulley wheel 10 although, it may also be used to connect a cable, or other flexible linear means capable of withstanding tension or pull, to an arcuate or circular member, an arm of a bellcrank or wherever it is desired to convert the linear movement of the cable into positive angular movement of a member to which it is attached. Although my invention is capable of numerous applications, for purposes of illustration, only one adaptation to a sheave has been shown in the drawing as it is believed that this is sufficient to teach the invention.

Figure 2:
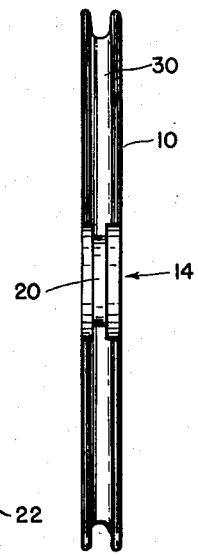
Fig. 2 is an end elevation of the pulley of Figure 1.

Generally speaking, the invention comprehends a member with radial elements, such as the pulley wheel 10 and a wedge-like cable holding member, or lock device 12 which is adapted to be received in a suitable slot 14, as shown in Figs. 1 and 2 particularly. The peripheral shape of the slot 14 is such that it receives the wedge member 12 to an extent sufficient to hold the latter therein in a substantially fixed, or wedged relationship. As shown, the bottom 16 of the slot 14 is circumscribed by the arc of a circle and has sides 18 extending tangentially therefrom so as to be slightly divergent with respect to each other. The slot 14 is also provided with a rib 20 preferably of rectangular cross-section and of linear shape corresponding to the slot periphery, but terminating short of the cable groove. This rib 20 is preferably formed integrally with the sheave 10 but is not as wide as the slot, as is best shown in Fig. 2. The purpose of the rib will be hereinafter described.

Figure 5:
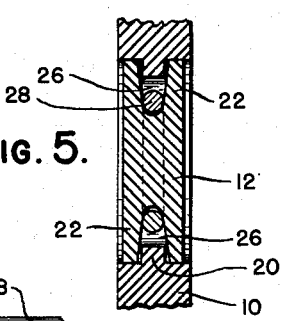
Fig. 5 is an enlarged cross-sectional view taken on the line 5—5 of Fig. 1 with the lock in engaged position.
Figure 4:
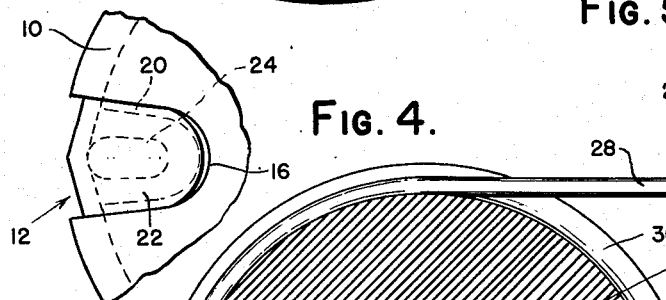
Fig. 4 is a cross-sectional view of a pulley with a lock device associated therewith.
Figure 6:
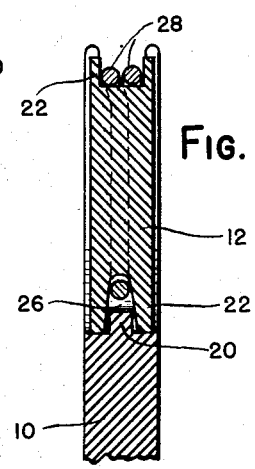
Fig. 6 is a similar assembled cross-sectional view taken on the line 6—6 of Fig. 1.

The wedge member 12 comprises two parallel flanges or side plates 22 spaced by a portion 24 which generally corresponds in outline to the peripheral shape of the sides 22, but of lesser surface area and with rounded ends. The thickness of, or distance between the faces of the wedge is slightly less than that of the pulley, as shown in Fig. 5, to permit a number of pulleys to be closely arranged. In practice it has been found desirable to cast the member 12 as a solid unit and then machine it so that a channel or cable groove 26 is cut therein. This channel is cut to such dimensions as to render it capable of being slid over the previously mentioned rib 20, such that the sharp corners of the latter ride on the sloping faces of the flanges to give a tight wedging action when the parts become fully telescoped. As best shown in Figs. 4 to 6 inclusive, the channel is of greater depth than the rib 20 so as to provide a space adapted to receive a bight or single run of an operating cable such as 28, which is also wedged or frictionally held between the sides of the groove. The depth of the latter is sufficient to accommodate several different cable diameters, which when wedged between the sides grabs the wedge better than when a small diameter cable lies at the bottom or valley of the channel.

Figure 7:
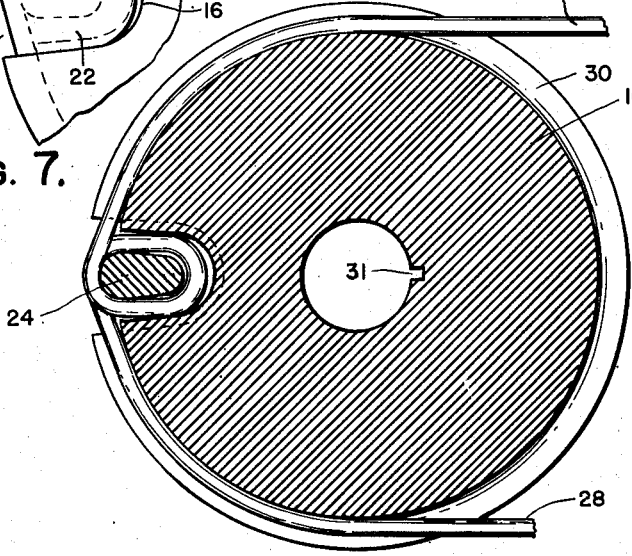
Fig. 7 is an exterior view of the lock portion of the assembly shown in Fig. 6.

With this construction the cable 28 may be releasably attached to the sheave 10 merely by passing a selected loop or bight completely around the periphery of portion 24 (see Fig. 4) of member 12 following which the latter member may be slid into the slot 14 until it wedges therein. The free ends of the cable 28 may then be laid within the groove 30 of the pulley to extend therefrom and be attached to their permanent operating connections (not shown). With this arrangement there is a positive drive connection between the pulley and the cable due to the fact that the cable is wedged between the flanges of lock 12 in close association therewith, the resulting friction developed between the cable and the wedge 12 being sufficient to prevent slipping or relative movement. As shown in Fig. 7, the inner end of the wedge is slightly more blunt than the radius of the slot bottom at 16, such that a crescent-shaped clearance space is maintained. By having this space it insures the proper wedging effect along the straight portions of the tapering sides with the result that the wedge 12 is not permitted to rock back and forth in the notch under reversal of load. This has been found to be relatively important to prevent "play" getting into a control system. The clearance adequately takes care of manufacturing tolerances and any wear that may come from frequent removal and replacement of the wedge.

The sheave in Fig. 1 is shown provided with a control link or arm 32 rotatably attached thereto by the pivot 33 at a predetermined radius, whereby angular movement of the sheave is transmitted by the arm to the desired control, such as the engine throttle or other controls. The sheave in such installations is preferably bushed or provided with a suitable anti-friction bearing 34 which is tightly fitted to form a hub for rotatable mounting upon a shaft or a bolt for attachment to its supporting structure. Other pulleys may preferably be provided, as in Fig. 4, with a keyway 31, or other similar means, to transmit such positive movement to a shaft or other similar member.

If, after installation, it becomes desirable to shift the pulley with respect to the cable all that is necessary is to uncouple or slacken one end of the cable, withdraw the lock device from the slot, shift it to a new position on the cable, reinsert it in the slot and as soon as the slack is taken up and the tension returned to the cable the locking thereof to the pulley will take place. It should be noted that no cutting or alteration of the cable is required upon the making of such an adjustment and that the channel 28 may be cut with such dimensions that various sized cables can be accommodated therein. Another advantage lies in the fact that adustments can be made without special tools and in positions of cramped space.

Various modifications of this invention in regard to structural details may be resorted to and such changes as fall within the scope of the appended claims are intended to be covered hereby.

I claim:

1. In combination, a cable, a member adapted for angular movement having a radially disposed slot extending transversely through the periphery thereof, a guide projecting into said slot the latter tapering toward the axis of said member, and means adapted for releasably locking the cable to said member comprising a lock member grooved completely around one circumference to receive a bight of said cable and insertable only in a radial direction upon said guide to wedge within the said slot whereby the cable is secured against relative movement.

2. In combination, a flexible tensioning element, a pulley wheel having a slot disposed at the periphery thereof, a member grooved around one circumference to receive a bight of said tensioning element and insertable into wedging relationship wholly within said slot with the grooved circumference in contact with the slot walls, whereby said tensioning element is retained in said groove by the walls of said slot and means projecting into the groove of said member to prevent lateral displacement thereof.

3. In combination, a cable, a pulley wheel having a cutout portion extending inwardly from the periphery thereof, a guide strip extending into the cutout sides, a grooved member adapted for insertion into said cutout space by sliding upon said guide, the latter fitting within said groove to a predetermined depth and the remainder of said groove being occupied by a bight of said cable in frictional engagement with the sides thereof.

4. In combination, a continuous cable, a pulley having a cut-out portion tapering inwardly from the periphery thereof, guide means projecting into the cut-out portion, a wedge grooved around its circumference to receive an intermediate bight portion of said cable and adapted for radial insertion into said cut-out portion by sliding upon said guide means whereby the cable is confined in said groove by the walls of the cut-out portion, the said guide means engaging the side of said groove whereby lateral displacement of said wedge from the said cut-out portion is prevented.

5. In a pulley wheel having a cut-out portion extending through its periphery, a cable attaching arrangement comprising a grooved wedge adapted for insertion into said cut-out portion, guide means associated with said cut-out portion to cooperate with said grooved wedge, the guide means fitting within the groove of said wedge to a predetermined depth and the remainder of said groove having tapered sides and being adapted for occupation by a portion of a cable.

6. In a pulley wheel having a portion of its periphery cut out, a cable attaching arrangement comprising a member adapted for insertion into said cut-out portion and guide means to prevent lateral movement of said member in said cut-out portion, the said arrangement being adapted to receive a portion of a cable in nonslidable relationship between said member and the walls of said cut-out portion.

7. In combination with a sheave having a recessed guide portion, a cable, and a cable lock comprising a wedge member defined by an arcuate end portion merging into two divergent tangentially disposed side portions and having a continuous channel cut centrally into the faces of said end and side portions adapted to receive said cable, the said guide being of substantially U-shape with its open end at the periphery of said sheave, said wedge member being adapted to engage said guide for cable locking purposes.

8. In combination, a flexible element adapted to transmit tension, a sheave member adapted for angular movement having a radially disposed slot extending transversely through the periphery thereof, said slot tapering toward the axis of said sheave member and means adapted for releasably locking the flexible element to said sheave member comprising a lock member shaped to be entirely received in said slot and grooved around one circumference to receive a bight of said flexible element and insertable only in a radial direction into said slot in its locking relationship.

9. In combination, a continuous flexible tensioning element, a pulley member adapted for angular movement and having a slot in its periphery extending fully across the face thereof, a guide positioned within said slot in the plane of said angular movement, and locking means adapted for releasably locking the flexible element to said member comprising a wedge centrally grooved to receive a bight of said element and radially insertable into said slot and upon said guide in wedging relationship to lock said tensioning element to said pulley member.

ROBERT R. RICHOLT.